United States Patent [19]

Pitzer

[11] Patent Number: 4,474,515
[45] Date of Patent: Oct. 2, 1984

[54] EXPANSION FASTENER

[75] Inventor: Kenneth H. Pitzer, Los Angeles, Calif.

[73] Assignee: The Shur-Lok Corporation, Irvine, Calif.

[21] Appl. No.: 349,049

[22] Filed: Feb. 16, 1982

[51] Int. Cl.³ ............................................. F16B 13/04
[52] U.S. Cl. ...................................... 411/16; 411/51; 411/60
[58] Field of Search ..................... 411/16, 18, 49, 50, 411/51, 60, 61, 62, 57, 44, 55, 151, 152, 479

[56] References Cited

U.S. PATENT DOCUMENTS

| | | | |
|---|---|---|---|
| 2,955,504 | 10/1960 | Lovrinch | 411/51 |
| 2,959,999 | 11/1960 | Wing | 411/49 |
| 3,373,648 | 3/1968 | Pitzer . | |
| 3,855,896 | 12/1974 | Kaufman | 411/60 X |

FOREIGN PATENT DOCUMENTS

| | | | |
|---|---|---|---|
| 1900911 | 11/1969 | Fed. Rep. of Germany | 411/51 |
| 2211713 | 9/1973 | Fed. Rep. of Germany | 411/18 |
| 653970 | 11/1928 | France | 411/152 |
| 1028264 | 2/1953 | France | 411/152 |
| 743651 | 1/1956 | United Kingdom | 411/55 |
| 1449452 | 9/1976 | United Kingdom | 411/55 |
| 2001148 | 1/1979 | United Kingdom | 411/60 |

Primary Examiner—Thomas J. Holko
Assistant Examiner—Adrian Whitcomb
Attorney, Agent, or Firm—Edward D. O'Brian; K. H. Boswell

[57] ABSTRACT

The utility of an expansion fastener including an externally threaded shaft having a head shaped so as to be capable of being engaged by a manipulative tool, a generally cylindrical longitudinally split sleeve located around the shaft, a nut threaded on the shaft, the sleeve and the nut including coacting surfaces capable of expanding the sleeve as the nut is moved on the shaft can be improved by utilizing coacting structures on the end of the sleeve remote from the head and on the nut for preventing relative rotation between the sleeve and the nut as the shaft is turned. Preferably the sleeve is twisted slightly in a spiral-like manner so that an end of the sleeve serves as one of the coacting structures which engages an adjacent ridged or other not smooth surface of the nut serving as the other coacting structure. An edge or an irregular surface of both at the other end of the sleeve can effectively be utilized to hold the sleeve against rotation relative to a panel or similar member as the shaft is turned relative to the nut.

5 Claims, 2 Drawing Figures

U.S. Patent    Oct. 2, 1984    4,474,515
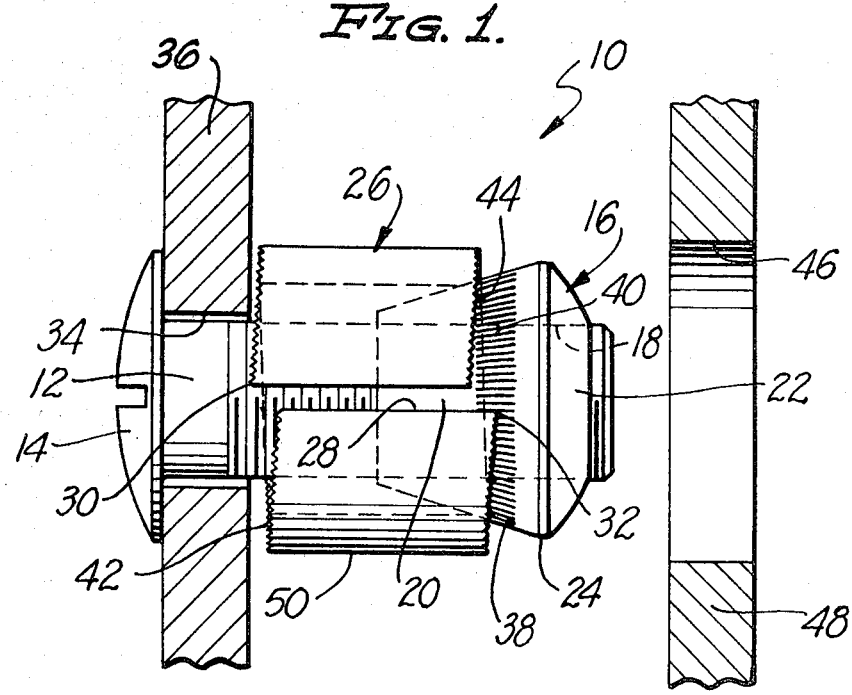
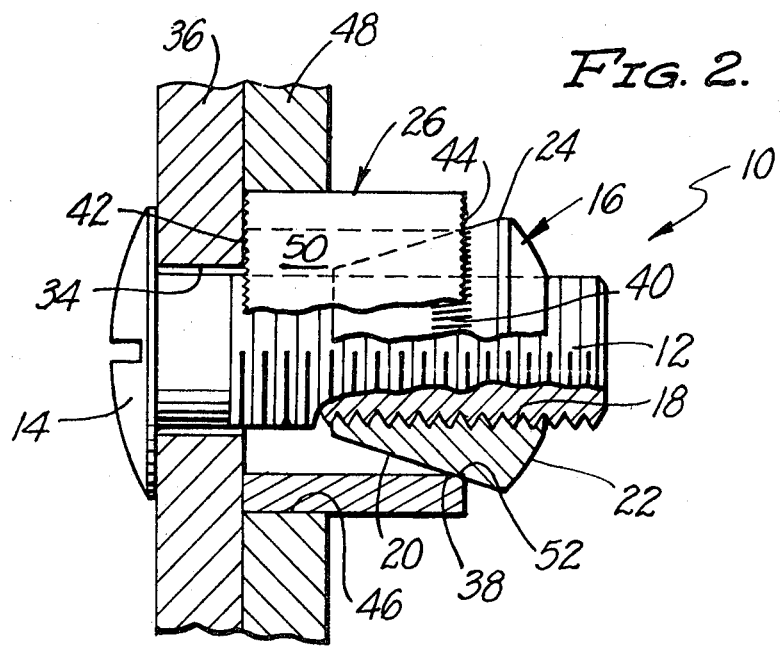

EXPANSION FASTENER

BACKGROUND OF THE INVENTION

The invention set forth in this specification pertains to new and improved expansion fasteners. More specifically the invention set forth in this specification pertains to an expansion fastener each of which is adapted to be supported within a hole in a first member in such a manner so as to be capable of being inserted into a hole in a second member and which is adapted to be manipulated when a part of it is within the hole in the second member so as to be expanded into engagement with the interior of the hole in the second member. Expansion fasteners of this category may be utilized with a wide variety of different applications. They are primarily utilized in various different locations where that it is only possible to gain access to the hole in the second member from one side or surface of the second member.

It is possible to construct expansion fasteners capable of being utilized in the manner indicated in the preceding paragraph in a number of different ways. It is considered that it has been most advantageous to construct expansion fasteners capable of being utilized as discussed in the preceding in the manner indicated in the Pitzer U.S. Pat. No. 3,373,648, issued Mar. 19, 1968 entitled "Fasteners with Expansion Sleeve". Fasteners of the type referred to in this discussion and in this patent have normally been constructed so as to utilize an externally threaded shaft provided with a head capable of being engaged with a manipulative tool so as to turn the shaft, a generally cylindrical, longitudinally split sleeve located around the shaft and a nut threaded on the shaft. In such a structure the sleeve and the nut include coacting conical surfaces serving to expand the sleeve as the nut is moved on the shaft towards the head. Because of their functions these surfaces can be referred to as expansion surfaces.

Fasteners of this type are normally constructed so that the shaft is capable of fitting through a hole in a first member but so that neither the head on the shaft nor the sleeve is capable of passing through this hole. A fastener of the type described herein is normally assembled on such a first member with the head and the sleeve on opposites sides of the first member so that both the sleeve and the nut extend outwardly around the shaft from one side of the first member. In this type of fastener normally both the nut and the unexpanded sleeve are dimensioned so as to be capable of fitting through a hole in a second member as previously indicated. Further these parts are dimensioned so that only a comparatively limited amount of rotation of the threaded shaft is necessary in order to expand the exterior of the sleeve into contact with the interior of the hole in the second member.

One of the major problems encountered with prior expansion fasteners of the type discussed in the preceding concerns the fact that dimensions of the parts with the sleeve in an unexpanded configuration should be such that there will be no relative rotation between the sleeve and the hole in the second member. When such relative rotation occurs the fastener will not expand as it is used but will rotate freely as the head of the shaft is turned. This, of course, is undesirable. In order to insure adequate friction to insure expansion it has been very important to dimension the parts so that there is a degree of contact between them sufficient to inhibit such relative rotation. This, of course, is somewhat expensive and, hence, undesirable.

BRIEF SUMMARY OF THE INVENTION

From the preceding it is believed that it will be apparent that there is a need for new and improved expansion fasteners of the type previously identified. The invention is intended to fulfill this need. The invention is intended to provide fasteners of the type indicated which are not apt to rotate freely instead of expanding during normal conditions of its use. A closely related objective of the invention is to provide fasteners as indicated which are constructed in such a manner that rotation of the threaded shaft in the fastener will always result in expansion of the fastener under normal conditions of use. The invention is further intended to provide expansion fasteners as noted which can be conveniently and easily manufactured at a comparatively nominal cost and which are capable of giving prolonged, reliable, satisfactory service.

The various objectives of this invention are achieved by providing: An expansion fastener which is adapted to be supported within a hole in a first member in such a manner as to extend from said first member and to be inserted into a hole in a second member and manipulated so as to be expanded into engagement with the interior of said hole in said second member, said fastener including, an externally threaded shaft, a head shaped so as to be capable of being engaged by a manipulative tool located at one end of said shaft, a longitudinally generally split, cylindrical sleeve located around said shaft, a nut threaded on said shaft, said sleeve and said nut including coacting expansion surfaces serving to expand said sleeve as said nut is moved on said shaft towards said head in which the improvement comprises: a holding means for preventing rotation of said sleeve by engagement with said first member when said fastener is located so that said shaft extends through said hole in said first member with said head on one side of said first member and said sleeve on the other side of said first member, said holding means being located on the end of said sleeve closest adjacent to said head so as to be capable of being drawn into engagement with said first member, coacting rotation preventing means, one of said coacting rotation preventing means being located on the end of said sleeve remote from said head, the other of said coacting rotation preventing means being located on said nut adjacent to said sleeve, said coacting rotation preventing means serving to prevent relative rotation between said sleeve and said nut when said sleeve and said nut are in contact with one another.

BRIEF DESCRIPTION OF THE DRAWINGS

Because of the nature of this invention it is best more fully described in reference to the accompanying drawing in which:

FIG. 1 shows an expansion fastener of the present invention in side elevation as this fastener is supported within a hole in a first member such as a panel and as the fastener is located adjacent to a hole in a second member such as a panel, these two members being shown in cross section in this view; and FIG. 2 is a view corresponding to FIG. 1 in which the fastener is located within the hole in the second member and is used to secure the two members next to one another, the fastener being partially in section in this view.

The particular expansion fastener shown in the drawing is a presently preferred embodiment or form of a fastener in accordance with this invention. Those skilled in the art of the design and construction of various types of fasteners will be able to design other somewhat differently appearing fasteners utilizing the principles or concepts of this invention defined in the appeneded claims through the use or exercise of routine engineering skill. For this reason the invention is not to be construed as being limited to expansion fasteners which are constructed exactly in the manner illustrated in the drawing.

DETAILED DESCRIPTION

In the drawing there is shown an expansion fastener 10 in accordance with this invention in which all of the parts are formed of a metal such as steel. This fastener 10 includes an externally threaded shaft 12 carrying an enlarged conventional head 14 which is adapted to be engaged by a manipulative tool such as, for example, a screw driver (not shown) when this shaft 12 is to be turned. If desired the shaft 12 and the head 14 may be referred to as a machine screw. It is considered preferable, however, to utilize the terminology employed in the preceding because it is conceivable that the fastener 10 of the present invention may be formed sufficiently large so as to not have the appearance of a conventional machine screw.

This fastener 10 includes a nut 16 having an internally threaded hole 18 which is threaded upon the shaft 12. This nut 16 is provided with a generally conical expansion surface 20 located symmetrically around the hole 18. When the nut 16 is located on the shaft 12 this expansion surface 20 increases in dimension according with the distance away from the head 14. If desired the nut 16 can have a somewhat domelike end 22 adjacent to the expansion surface 20 which will serve to reinforce the periphery 24 of the nut 16 against deformation as the fastener 10 is used.

The fastener 10 also includes a sleeve 26 of a generally cylindrical shape. This sleeve includes a longitudinally extending slot or slit 28. Preferably the sleeve 26 differs from a cylindrical shape slightly in that it is deformed or twisted substantially as illustrated in FIG. 1 of the drawing. If desired this particular configuration may be referred to as a partially spiral or helical configuration. As a result of being twisted as shown the sleeve 26 may be regarded as a type of elongated coil spring which includes two end edge portions 30 and 32 which extend generally outwardly away from one another on opposites of the slit 28 as illustrated in FIG. 1. Preferably the internal diameter of the sleeve 26 is sufficient that it will fit relatively loosely around the shaft 14. The internal diameter of this sleeve 26 should, however, be sufficiently small so that the sleeve 26 will fit generally against the surface 20 adjacent to the hole 18. This will permit expansion of the sleeve 26 subsequently described.

Prior to the use of the fastener 10 the shaft 12 is inserted through a hole 34 in a first member or panel 36 so that the head 14 rests against this first member 36. The sleve 36 and the nut 14 are then assembled on the shaft 26 as indicated in FIG. 1. Preferably the nut 16 is tightened down during such assembly to a sufficient extent so that the portion 30 frictionally engages the first member 36 and so that the portion 32 frictionally engages the surface 20 approximately as illustrated in FIG. 1. At this point the portion 30 will serve as a holding means which will prevent rotation of the sleeve 26 relative to the first member 36. The portion 30 will, of course, continue to serve this function as the sleeve 26 is thereafter tightened down upon the shaft 12.

Also the portion 32 on the sleeve 26 will engage the surface 20 and tend to "bite" into this surface to a sufficient extent to prevent relative rotation between the sleeve 26 and the nut 16 as this nut 16 is tightened down upon the shaft 12. Because of this the portion 32 can be referred to as a "rotation preventing means" which coacts with the surface 20 as this surface serves as another "rotation preventing means". In the event that the nut 16 is formed of a sufficient hard material that the portion 32 will not bite into the nut 16 so as to block such relative rotation it is desirable to utilize a nonsmooth surface 38 on the surface 20 as a rotation preventing means which cooperates with the portion 32. This surface 38 extends in a band around the surface 20 which is transverse to the axis of the hole 18. Preferably it consists of a series of logitudinal extending ridges 40 located immediately adjacent to one another as shown.

In the event that either the sleeve 26 or the first member 36 are of such relative hardness that the portion 30 will not adequately "bite" into and hold the first member 36 it is possible to locate a nonsmooth surface 42 such as a knurled surface on the sleeve 26 adjacent to the portion 30 so as to increase the relative friction between the sleeve 26 and the member 36. A similar surface 44 can be located on the sleeve 26 adjacent to the portion 32 for engaging the surface 20 for the same purpose.

After the fastener 10 has been assembled as described it can be used by inserting through a hole 46 in a second member 48 as indicated in FIGS. 1 and 2 of the drawings. This hole 46 should be sufficiently large so as to pass around the periphery 24 of the nut 16 and the exterior 50 of the sleeve 26. Also this hole 46 should be of a dimension reasonably corresponding to slightly less than the maximum amount that the sleeve 26 can be expanded as subsequently described as the fastener 10 is used. Such use of the fastener 10 is rather simple.

After the second member 48 has been located generally around the sleeve 26 such use involves applying a manipulative tool (not shown) to the head 14 so as to rotate the shaft 12. As this occurs the nut 16 will draw down on the shaft 12 generally towards the sleeve 26. This will cause the portion 30 to firmly engage the first member 36 so as to secure the sleeve 26 against rotation and will cause the portion 32 to also engage the surface 20 and the ridge 40 so as to firmly secure the nut 16 against relative rotation with respect to the sleeve 26.

Concurrently an internal terminal edge 52 on the sleeve 26 will move against the surface 20 so as to coact with this surface 20 in order to expand the sleeve 26. The edge 52 is preferably slightly rounded to prevent any possibility of it biting into the surface 20. If desired this edge 52 can be replaced with a beveled surface (not shown). Because of its function this edge 52 may be referred to as an expansion surface which coacts with the surface 20. As the sleeve 26 expands it, of course, will be compressed so as to be placed under compression while concurrently it will be expanded outwardly. Such outward expansion will increase its effective diameter to a sufficient point that the interior of the hole 46 will be firmly engaged so as to secure the second member 48 in a location as shown in FIG. 2 of the drawings.

I claim:

1. An expansion fastener which is adapted to be supported within a hole in a first member in such a manner as to extend from said first member and to be inserted into a hole in a second member and manipulated so as to be expanded into engagement with the interior of said hole in said second member, said fastener including, an externally threaded shaft, a head shaped so as to be capable of being engaged by a manipulative tool located at one end of said shaft, a longitudinally generally split—between its ends—, cylindrical sleeve located around said shaft, a nut threaded on said shaft, said nut and said sleeve being separate, unattached parts, said sleeve and said nut including coacting expansion surfaces serving to expand said sleeve as said nut is moved on said shaft towards said head in which the improvement comprises:

said sleeve is formed of a material capable of serving as a spring and is twisted between its ends in such a configuration that it is capable of being compressed between its ends during use of said expansion fastener, a holding means comprising an extending edge on the end of sleeve closest adjacent to said head for preventing rotation of said sleeve by engagement with said first member when said fastener is located so that said shaft extends through said hole in said first member with said head on one side of said first member and said sleeve on the other side of said first member, said holding means being located on the end of said sleeve closest adjacent to said head so as to be capable of being drawn into engagement with said first member, coacting rotation preventing means, one of said coacting rotation preventing means comprising an extending edge located on the end of said sleeve remote from said head, the other of said coacting rotation preventing means comprising a surface on said nut located on said nut adjacent to said sleeve, said coacting rotation preventing means serving to prevent relative rotation between said sleeve and said nut when said sleeve and said nut are in contact with one another.

2. An expansion fastener as claimed in claim 1 wherein:

said expansion surface on said nut is a conically shaped surface on the side of said nut closest adjacent to said first member, said conically shaped surface also being said surface serving as one of said coacting rotation preventing means.

3. An expansion fastener as claimed in claim 2 wherein:

said expansion surface on said sleeve is an internal terminal portion of said sleeve.

4. An expansion fastener as claimed in claim 1 wherein:

said expansion surface is a conically shaped surface on the side of said nut closest adjacent to said first member, said surface serving as one said coacting rotation preventing means comprising a non-smooth surface extending in a band around said conically shaped surface.

5. An expansion fastener as claimed in claim 4 wherein:

said expansion surface on said sleeve is an internal terminal portion of said sleeve.

* * * * *